United States Patent [19]
Futagawa et al.

[11] 3,745,435
[45] July 10, 1973

[54] DRIVING CIRCUIT FOR BRUSHLESS MOTOR

[75] Inventors: Yoshikiyo Futagawa; Chiaki Komatsu, both of Suwa, Japan

[73] Assignee: Kabushiki Kaisha Suwa Seikasha, Tokyo, Japan

[22] Filed: Oct. 4, 1971

[21] Appl. No.: 186,279

Related U.S. Application Data

[63] Continuation-in-part of Ser. No. 16,178, March 3, 1970, abandoned.

[52] U.S. Cl................. 318/254, 318/439, 318/138
[51] Int. Cl............................................ H02k 29/00
[58] Field of Search................. 318/696, 685, 254, 318/439, 138

[56] References Cited
UNITED STATES PATENTS

| | | | |
|---|---|---|---|
| 3,305,713 | 2/1967 | Ikegami | 318/138 |
| 3,242,404 | 3/1966 | Faure | 318/138 |
| 3,239,739 | 3/1966 | Scholl | 318/138 |
| 3,386,019 | 5/1968 | Hill | 318/254 |
| 3,257,593 | 6/1966 | Schlossar | 318/254 |
| 3,339,133 | 8/1967 | Faure | 318/254 |
| 3,453,512 | 7/1969 | Polakowski | 318/254 |
| 3,419,782 | 12/1968 | Sheldrake et al. | 318/254 X |

*Primary Examiner*—G. R. Simmons
*Attorney*—Alex Friedman, Lawrence Rosenthal et al.

[57] ABSTRACT

A driving circuit for a brushless motor wherein each driving coil is energized in response to the receipt of a signal by a receiving coil from a transmitting coil. A continuously rotating slotted shield disk rotates synchronously with the rotor shaft of the motor for intermittently preventing the transmission of the signal from the transmitting coil to the receiving coil. A transmitting and receiving coil pair is provided for each driving coil.

6 Claims, 5 Drawing Figures

3,745,435

DRIVING CIRCUIT FOR BRUSHLESS MOTOR

CROSS REFERENCE TO RELATED APPLICATION

This is a continuation-in-part application of our application Ser. No. 16,178, filed Mar. 3, 1970, now abandoned.

BACKGROUND OF THE INVENTION

The present invention relates to a driving circuit for brushless motor.

There are many detecting means known for detecting the rotor position and the rotational speed of the rotor without using an electro-mechanical commutator, e.g., detecting radiation energy using a photo-transistor, detecting magnetic energy using magnetic material and hole element and means in which the oscillation of an electrical self-oscillating semi-conductor circuit is stated and stopped electrically.

In the last detecting method, a shield disk, attached coaxially with the rotor shaft and having a cut-away portion, is used to detect rotor position by starting or stopping the electrical self-oscillation. Describing this in more detail, if the shield plate portion is placed in the gap between the two oscillating coils, the Q value of the two coils is lowered and electrical oscillation stops. On the other hand, if the notch of the shield disk comes between the two oscillating coils, the Q value of the two coils is increased and electrical oscillation starts. Applying this principle, a detecting device carrying the shield disk with notches is provided. The detecting coil opposing the notch of the shield disk oscillates electrically. The oscillating signal is converted to a D.C. input signal by the demodulating circuit, and electric power is amplified to allow current to flow through the driving coil of the motor. The shape of the detecting disk is designed in such a manner that the shield disk opposes the detecting coil corresponding to the other driving coils and current does not flow through the other driving coils. The notch of the detecting disk mounted coaxially with the rotor shaft is such that the current flows through the driving coil next to the one now energized. Thus, the driving coils are energized one after another and the motor continues to rotate.

In this conventional system, however, n pieces of oscillating circuit are required for an n-phase driving motor; that is to say, many circuit elements are necessary. In addition, the oscillator itself is started or stopped by said disk. If the ambient temperature and the supplied voltage are changed, it is difficult to stablize the oscillating circuit due to variation of the operating point. As a result, the oscillating circuit does not operate normally and the motor does not operate in a stable condition.

SUMMARY OF THE INVENTION

One object of the present invention is to provide a driving circuit for brushless motor which requires a very small number of parts in comparison with the conventional method and operates stably even though subjected to change in ambient temperature and supplied voltage.

The driving system according to the invention detects the rotor position without contact points. In this type of system, the receiving coil corresponding to each driving coil receives a radio frequency signal from the transmitting coil which constantly oscillates. As the shield disk enters in or comes out of the gap between the transmitting coil and the receiving coil, the radio frequency signal of the oscillator is alternatively "not received" or "received."

The shield disk coaxial with the rotor shaft rotates constantly. A notch is provided on the outer periphery of the shield disk. As the rotor rotates, the notches rotate with it. A radio frequency wave voltage is induced in the receiving coil opposite the notch. By demodulating and amplifying the signal, the driving coil of the motor is energized. In our constant oscillating method, the circuit can be easily stabilized by variation of the operating point even though subjected to the change in supplied voltage and ambient temperature, because the feed back ratio of the oscillating circuit is large enough. Additionally, since the oscillating coils can be connected in series or in parallel in a common oscillating circuit, the number of parts required is minimal.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
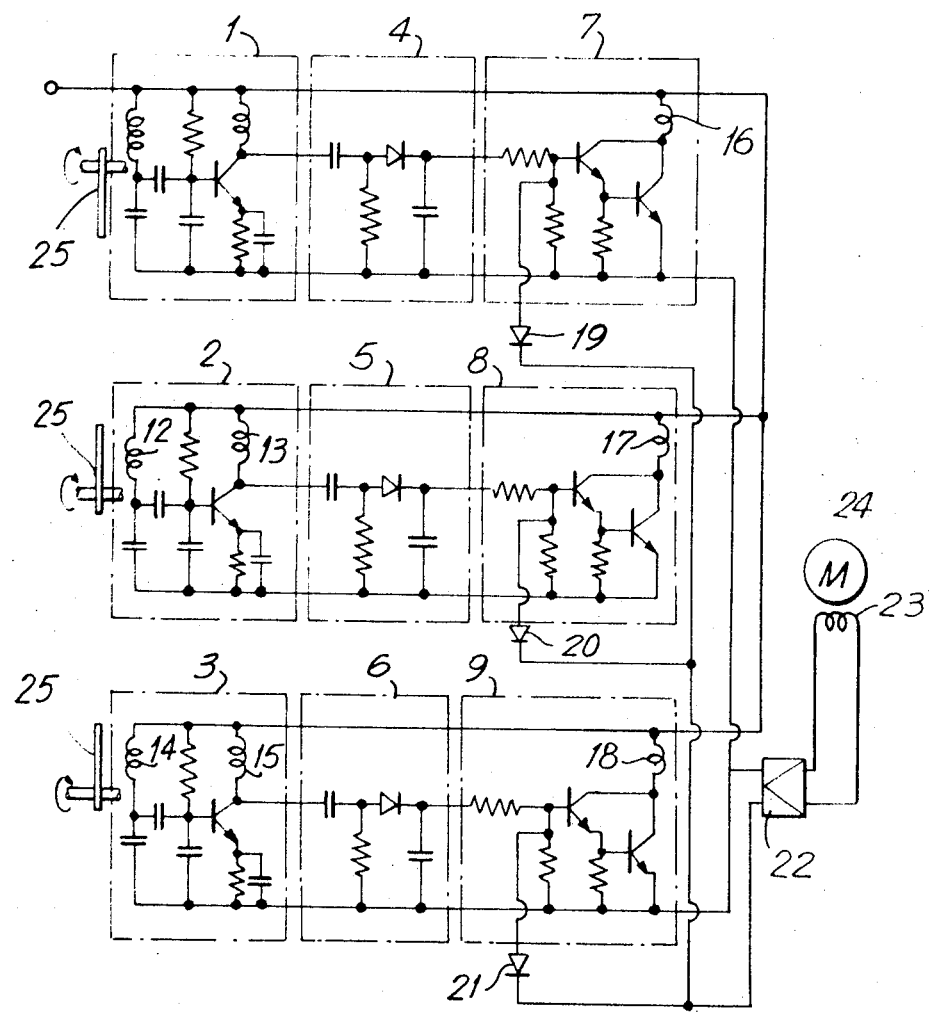
FIG. 1 shows a conventional type of driving circuit for brushless motor.

FIG. 1 shows an example of the conventional type of motor driving circuit. 1, 2 and 3 are oscillating circuits for detecting rotor position. 4, 5 and 6 are demodulating circuits. 7, 8 and 9 are power amplification circuits, 10, 11, 12, 13, 14 and 15 are oscillating coils. 16, 17 and 18 are driving coils. 19, 20, and 21 are diodes for speed control. 22 is a speed control circuit. 23 is a coil for detecting speed. 24 is a rotor. 25 is a shield disk. Coupled oscillating coils 10 and 11, 12, 13, 14 and 15 are disposed opposite each other. When a pair of coils 10 and 11 are coupled electromagnetically and oscillated, oscillating current is demodulated into D.C. current by the demodulating circuit 4, and amplified by the amplification circuit 7 to allow current to flow through the driving coil 16. The other two pairs of coils 12, 13, 14 and 15 perform the same oper-ation.

The driving system of the conventional motor is as follows:

Each three oscillating coil pairs are oscillated in turn and current flows through the driving coils one after another. Thus the rotor rotates by the three-phase control current. The shield disk attached coaxially with the rotor and having three notches on the outer periphery operates three pairs of oscillating coils. In the conventional type of motor such as this, the minimum circuit components are:

Transistors : 9

Condensers : 18

Resistors : 18

Diodes : 6

Figure 2:
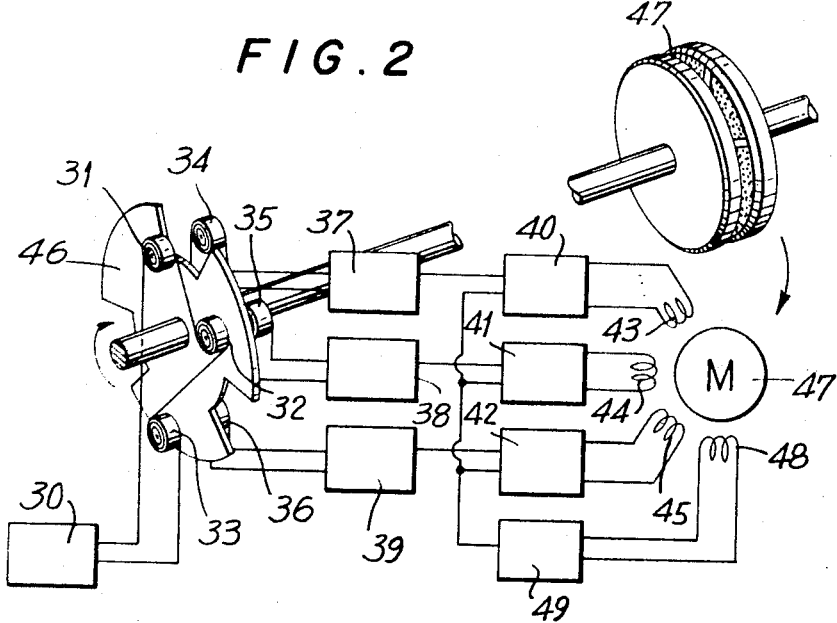
FIG. 2 is a block diagram of driving circuit for brushless motor according to the present invention.

FIG. 2 shows a block diagram of circuit according to the present invention. 30 is an oscillating circuit, 31, 32 and 33 are transmitting coils. 34, 35 and 36 are receiving coils corresponding to the transmitting coils 34, 35 and 36. 37, 38 and 39 are amplifiers which amplify the receiving signal from the receiving coils 34, 35 and 36. 40, 41 and 42 are motor driving circuits comprising a switching transistor for the driving coils 43, 44 and 45. 46 is a shield disk having notches and synchronously rotating with the motor 47. 48 is a speed control coil connected to the input circuit of the speed control circuit 49. The frequency of the oscillating circuit 30 is very high compared to the rotation cycles of the rotor. Three independent oscillating circuits with the corresponding receiving coils 34, 35 and 36 are not necessary for driving transmitting coils 31, 32 and 33. The oscillating device may be constituted with one common oscillating circuit. Thus the number of circuit components can be decreased. In addition, an external oscillating signal may be received in the receiving circuit.

FIG. 2 shows an example of the oscillating coils connected in series. The same effect can be obtained when said coils are connected in parallel.

Flux generated from the transmitting coil interlinks with the receiving coil at the cut away portion of the shield disk and induces current through the receiving coil. When the shield plate extends into the gap between the transmitting coil and receiving coil, the magnetic flux of said receiving coil is shielded by the eddy current of the shield disk and voltage is not induced in the receiving coil. The voltage induced in the receiving coil is amplified at the amplification circuit. The amplified signal controlled by signal from the speed control circuit 49 in response to the induced voltage in the speed detecting coil 48 enters in the input terminal of the driving circuit. The voltage of the receiving signal is induced in the receiving coils 34, 35 and 36 in that order when said coils are opposed to the notches. The rotor is driven by the current energized in the driving coils 43, 44 and 45 in that order. Since the receiving signal is modulated by the rotating cycle of the shield plate 46, it is necessary to provide the demodulation circuit in the receiving circuit.

Figure 3:
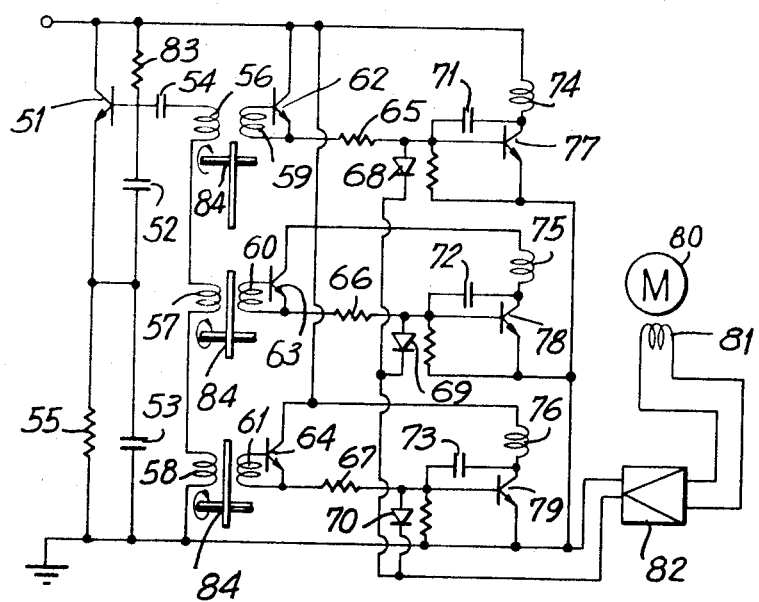
FIGS. 3 and 4 show embodiment of driving circuit for brushless motor according to the invention.

FIG. 3 shows a circuit embodiment using a simplified and improved demodulation circuit. Although in this embodiment, the voltage induced by the rotation of the motor 47 is used for speed control, there are many other speed control methods. For example, the number of pulses of the voltage signal is detected to control motor speed. Especially when the load on the motor is constant, the speed control system is not always necessary. The rotational speed is constant when the load energy and electrical input energy are balanced with each other. For controlling the rotational speed of the motor, there are various methods used, for example, electronics, radiation energy, magnetic energy and mechanics. As for the electrical controlling methods, the signal detected from the driving coil is rectified and entered in the motor driving circuit. Among the controlling methods which may be incorporated in the speed control circuit of the driving circuit are controlling energy generated from the oscillating circuit; controlling energy received at the receiving circuit, or controlling the output energy obtained from the power amplification circuit.

Figure 4:
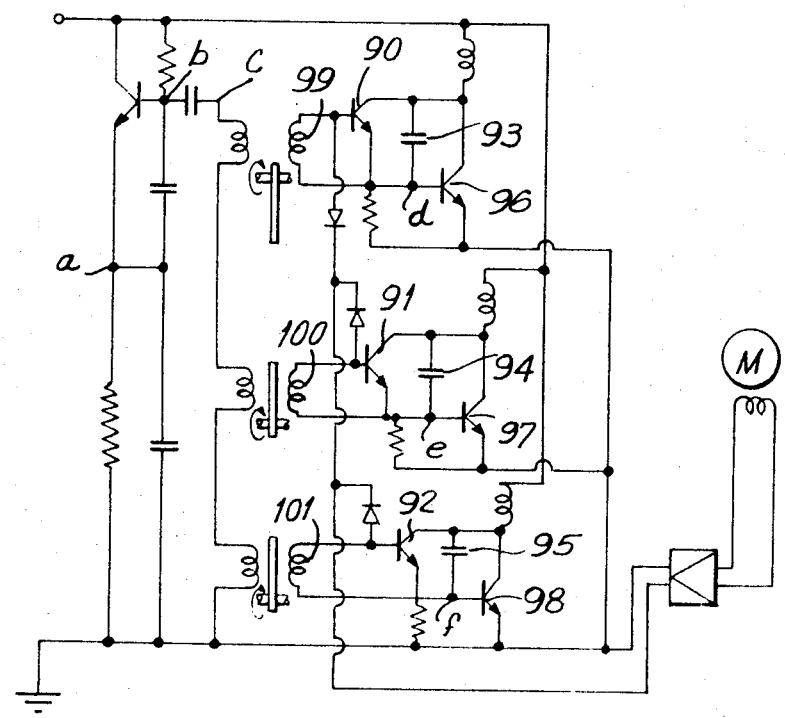

In addition to the embodiments shown in FIGS. 3 and 4, the control terminals may be connected to the points $a$, $b$, $c$, $d$, $e$, and $f$ in FIG. 4. In the driving system using the integrated circuit comprising elements of transistor and resistor, etc., it is more convenient to control the oscillating output by the control circuit wherein the transistor is connected with the oscillating transistor in series. In the mechanical control system comprising a mechanical contact point on the rotor shaft, switching speed of the contact point may be amplified by the transistor to control the motor speed. FIG. 3 shows one embodiment of the transmitting circuit, receiving circuit for receiving transmitting signal and motor driving circuit. The output energy from the oscillator comprising transistor 51, condensers 52, 53 and 54, resistors 55 and 83 and transmitting coils 56, 57 and 58 are transmitted to the opposing receiving coils 59, 60 and 61 respectively and are amplified by the transistors 62, 63 and 64. The amplified signal enters through the resistors 65, 66 and 67 into input terminal of the transistors 77, 78 and 79 which control current flowing through the driving coils 74, 75 and 76. On the other hand, electric voltage induced at the speed detecting coil 81, as a result of the rotation of the motor 80 is eliminated by the speed control circuit 82. Thus if the motor speed increases, the induced voltage operates so as to decrease the input current of the driving transistors which enters the base electrodes of the transistors 77, 78 and 79 through the diodes 68, 69 and 70. The driving current is supplied to the motor driving coils 74, 75 and 76 so as to maintain the motor speed constant. 84 is a rotary shield disk provided with cut-away portions. Signals amplified by the transistors 62, 63 and 64 are oscillating signals modulated synchronizing with motor rotation, so the condensers 71, 72 and 73 serve to demodulate current flowing through the motor coils 74, 75 and 76 by integrating oscillating signal and also serve to prevent parasitic oscillation produced by storage capacity between the driving coils (74, 75, 76) and the transistors (77, 78, 79).

FIG. 4 shows an improved embodiment of FIG. 3. Transistors 90, 91 and 92 for amplifying receiving signal are connected to the power amplifying transistors 96, 97 and 98 by means of compound connection. Condensers 93, 94 and 95 are connected between the electrodes transistor for demodulation and for preventing parasitic oscillation. The other components operate the same as the embodiment in FIG. 3. The number of components in the present embodiment is very small compared with the conventional method.

Transistors : 7

Condensers : 6

Resistors : 5

Diodes : 3

In the above embodiments, each part may be connected in various ways. Some examples are given in the following: Receiving coils 99, 100 and 101 in FIG. 4 may be connected between base and earth of the transistors 90, 91 and 92. But the embodiment of the present invention has the advantage that the transistor is operated by a very faint receiving signal. Condensers 93, 94 and 95 may be connected between base and earth of the transistors 96, 97 and 98. But in this embodiment, a condenser with a smaller capacity is sufficient and the electric circuit is miniaturized in size.

In the present embodiment, the transistors 90, 91 and 92 are used to amplify the receiving signal. However, when the receiving signal has enough energy, the demodulating circuit may consist of such passive elements as resistors, condensers and diodes In the present invention, the shield disk mounted coaxially with the rotor detects rotor position. However, it may also be constructed so that the outwardly extending portion of the yoke formed of a magnetic material for the magnetic closed circuit of a permanent magnet, may also form a shield disk, and the transmitting coil and receiving coil may be disposed along the periphery of the rotor to detect rotor position.

As can be understood from the above description, in the driving circuit for brushless transistorized motor according to the invention, the circuit is stable due to the fact that the oscillating circuit is always oscillating. One oscillating circuit is sufficient even when n-phase control motor is used, so the numbers of circuit element is greatly decreased. As a result, assembly and adjustment are easy for mass production.

Figure 5:
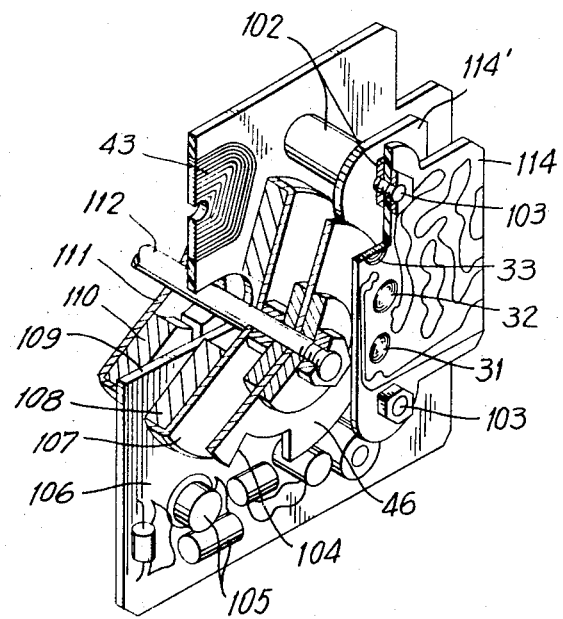
FIG. 5 is a partially sectioned schematic view of one embodiment of the brushless motor according to thee invention.

FIG. 5 depicts one embodiment of the motor of FIG. 2. In said embodiment, a pair of yokes 107 and 111 are mounted in spaced relation on rotor shaft 112. A plurality of permanent magnets 110 are mounted on yoke 111 while a corresponding plurality of permanent magnets 108 are mounted on yoke 107. The magnets 110 and 108 are substantially aligned in opposed pairs having an air gap therebetween. The poles of the permanent magnets 108 and 110 are aligned with the axis of rotor shaft 112 and the permanent magnets of each opposed pairs of permanent magnets is such as to define a magnetic circuit, the polarities of adjacent pairs of permanent magnets being preferably oppositely aligned. Mounted within the gap between permanent magnet 108 and 110 is a main circuit board 106 within which are imbedded all of the driving coils 43, 44 and 45, positioned so as to be in registration with the pairs of permanent magnets on yokes 107 and 111. The circuit elements of the driving circuitry according to the invention are also mounted on main circuit board 106. Supported on said main circuit board by bolts 103 and spaced therefrom by spaces 102 are circuit boards 114 and 114'. Circuit board 114 has the transmitting coils 31, 32 and 33 imbedded therein, and preferably carries the oscillator circuit 30. Circuit board 114' carries the receiving coils 34, 35 and 36, and may also carry the preamplifying circuitry. The shield plate disk 46 is also mounted on rotor shaft 112 and is positioned intermediate mounting boards 114 and 114', said shield disk being provided with cut away regions 104 in accordance with the invention. The main circuit board is provided with a notch 109 which permits the easy insertion and removal of said main circuit board and circuit boards 114 and 114' as a unit, for the purposes of changing the phase of thpe motor, and for the purpose of repairing failures in the circuitry or coil. One advantage according to the invention is that the number of phases can be changed merely by changing the various circuit boards, without changing the shape of the rotor and the yokes thereon. An equal number of transmitting and driving coils would be provided.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A multi-phase brushless motor comprising a rotor shaft; magnetic circuit means mounted on said shaft and formed with an air gap; at least three driving coils in said air gap for driving said motor; at least three pairs of further coils, one of each of said pair being a transmitting coil and the other of each of said pairs of further coils being a receiving coil; a single oscillatory circuit connected to all of said transmitting coils for applying oscillating energy to each of said transmitting coils; a rotative shield disc coaxially mounted on said rotor shaft and formed with cut out regions, said pairs of further coils being positioned so that said shield disc passes therebetween, each of said transmitting coils transmitting electrical oscillating energy to the associated receiving coil when a cut out region is in registration therewith, such transmission being otherwise barred by said shield disc; a demodulator circuit connected to each of said receiving coils for changing the signal received thereby to a direct current signal; a driver circuit connecting each of said demodulator circuits to a driving coil for actuating said driving coil in response to said direct current signal, the number of said pairs of further coils being equal to the number of said driving coils, said oscillatory, demodulator and driver circuits including a plurality of components; a first base plate formed with a notch therein dimensioned to receive said shaft to permit displacement of said first base plate into and out of an operative position, said first base plate carrying a portion of said circuit components and having said driving coils embedded therein in circumferentially spaced relation relative to said shaft; second and third base plates; and means mounting said second and third base plates in spaced relation with each other and with said first base plate, said transmitting coils being embedded in said second base plate, said receiving coils being embedded in said third base plate, at least one of said second and third base plates carrying a further portion of said circuit components.

2. A brushless motor as recited in claim 1, wherein said driver circuit includes a driver transistor having a collector and base, said demodulator circuit including a demodulating condenser connected between said driver transistor collector and base.

3. A brushless motor as recited in claim 1, including a control means for regulating the rotational speed of said rotor, said control means being connected to all of said demodulator circuits for varying the magnitude of the signal applied to said demodulator circuitsin response to the rotational speed of said rotor.

4. A brushless motor as recited in claim 1, including control means for regulating the rotational speed of said rotor shaft, said control means being connected to all of said driver circuits for varying the magnitude of the direct current signal applied to said driver circuits in response to the rotational speed of said rotor shaft.

5. A brushless motor as recited in claim 1, wherein each of said demodulator circuits includes a preamplifying transistor having an emitter, collector and base for changing the signal received by the receiving coil to said direct current signal, said receiving coil being connected between said preamplifying transistor emitter and base, each of said driver circuit including a driver transistor having an emitter, collector and base, said preamplifying transistor collector and emitter being connected between said driver transistor collector and base, a driving coil being connected in series with said driver transistor emitter to collector path.

6. A brushless motor as recited in claim 1, including control means for regulating the rotational speed of said rotor shaft, said control means being connected to said oscillatory circuit for varying the magnitude of the oscillating energy applied to said transmitting coils in response to the rotational speed of said rotor.

* * * * *